United States Patent [19]
Thornton

[11] Patent Number: 5,832,371
[45] Date of Patent: Nov. 3, 1998

[54] MODULAR RADIOTELEPHONE

[75] Inventor: Curtis Wayne Thornton, Cary, N.C.

[73] Assignee: Ericsson, Inc., Research Triangle Park, N.C.

[21] Appl. No.: 740,781

[22] Filed: Nov. 1, 1996

[51] Int. Cl.[6] .................................. H04B 1/08; H05K 5/02
[52] U.S. Cl. ........................... 455/90; 361/814; 361/816; 453/348; 453/349
[58] Field of Search .......................... 455/90, 346, 347, 455/348, 349, 350; 361/807, 814, 816

[56] References Cited

U.S. PATENT DOCUMENTS

| | | | |
|---|---|---|---|
| 4,032,844 | 6/1977 | Imazeki | 455/90 |
| 4,090,134 | 5/1978 | Arai | 455/90 |
| 5,271,056 | 12/1993 | Pesola | 455/90 |
| 5,438,482 | 8/1995 | Nakamura et al. | 361/816 |
| 5,748,455 | 5/1998 | Philips | 361/814 |

FOREIGN PATENT DOCUMENTS

WO 9534958  12/1995  WIPO.

OTHER PUBLICATIONS

PCT International Search Report, Oct. 28, 1997, File No. PCT US 97/19429.

*Primary Examiner*—Howard Britton
*Attorney, Agent, or Firm*—Jenkens & Gilchrist

[57] ABSTRACT

Separate electromechanical and electronic modules are detachably electrically interconnected to provide a telecommunication instrument, such as a cellular telephone, which can be mechanically redesigned to a variety of configurations without changing the basic electronic circuits of the instrument. The electronic module is enclosed within a canister providing RF shielding for electrical circuits in the electronic module. If desired, the electromechanical and electronic modules may be enclosed within a disposable cover that conveniently provides recycling of the instrument after a period of limited use.

12 Claims, 4 Drawing Sheets

MODULAR RADIOTELEPHONE

BACKGROUND OF THE INVENTION

1. Technical Field

This invention relates generally to a portable telecommunication instrument, and more particularly to such an instrument having replaceable modular components.

2. History of Related Art

Portable telecommunication instruments, such as radiotelephones and, in particular cellular telephones, have become increasingly popular and are now found in widespread use in most areas of the world. As the consumer market grows, and an increasing number and variety of such instruments are introduced, it has become increasingly difficult to design new products that differentiate from previous products and appeal to increasingly sophisticated purchasers. When a new radiotelephone is designed, the manufacturer attempts to provide the telephone with a "new" look, features, or operator interface. Typically, this requires that, above the basic component level, there be very little commonality from one phone model to another. This design limitation restricts the ability of a manufacturer to develop new phones having a new form in a timely manner. Many of the same problems must be solved with each new design, for example, shielding, connectors, and arrangement and interconnection of the basic telephone circuits. Thus, considerable research, engineering and development time, effort and cost must be expended for even minor model changes.

Previous attempts to use common components from one radiotelephone to another have been limited to the arrangement of certain chips, the location of speaker and microphone, and a design of the front housing and keypad. For example, some radiotelephones are produced in different models having different front housings, but the location of the speaker, microphone, and keypad are the same in each model. Thus, the overall design of a family of products is often limited primarily to appearance and certain cosmetic modifications.

It is desirable to have a portable telecommunication instrument arrangement that permits the position and arrangement of the electromechanical components to be configured for optimum design and user interface, without the need to redesign the arrangement, interconnection, and shielding of the basic telephone circuitry for each model. It is also desirable to have such a design wherein the basic telephone circuitry is enclosed within a shielded container that can be readily connected to a variety of electromechanical user interface modules having a wide variety of sizes, shapes and features.

SUMMARY OF THE INVENTION

In accordance with one aspect of the present invention, a portable telecommunication instrument includes an electromechanical module, a front housing adapted to support the electromechanical module, an electronic module, and a canister adapted to protectively support the electronic module. Typically, the electromechanical module includes a keypad, a speaker, and a microphone. The electronic module includes radio-frequency and logic circuits. The portable telecommunication instrument also includes a means for providing an electrical connection between the electromechanical module and the electronic module.

Other features of the portable telecommunication instrument embodying the present invention include the electronic module having electronic components mounted on a printed circuit board which provides predefined electrical communication between the components. Other features include the printed circuit board having a battery connector that is in electrical communication with the radio-frequency and logic circuits.

Still other features of the portable telecommunication instrument embodying the present invention include the electromechanical and electronic modules being substantially enclosed within a disposable cover. The disposable cover may also provide a portion of an enclosure around the canister and battery pack.

BRIEF DESCRIPTION OF THE DRAWINGS

A more complete understanding of the structure and operation of the present invention may be had by reference to the following detailed description when taken in conjunction with the accompanying drawings, wherein:

FIG. 4 is a three-dimensional view of the electronic module of the cellular telephone embodying the present invention.

DETAILED DESCRIPTION OF A PRESENTLY PREFERRED EXEMPLARY EMBODIMENT

In the following exemplary embodiment, the portable telecommunication instrument embodying the present invention is described with specific reference to a cellular telephone 10. Importantly, the cellular telephone 10 comprises an electromechanical module 12 that may be configured and arranged for specific applications, and an electronic module 14 that is of a generic construction that may be used with a variety of electromechanical modules 12.

Figure 1:
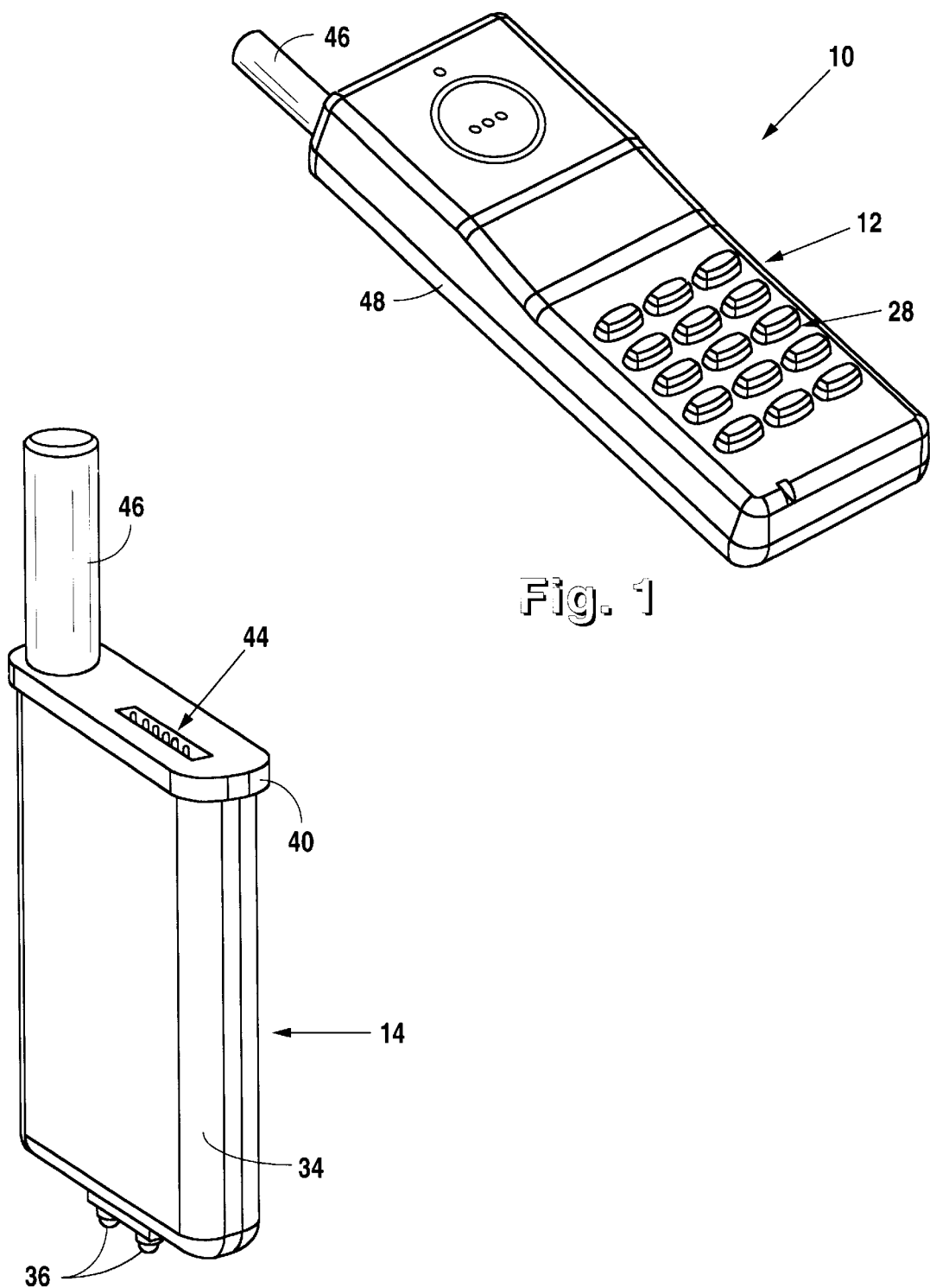
FIG. 1 is a three-dimensional view of a cellular telephone embodying the present invention.
Figure 2:
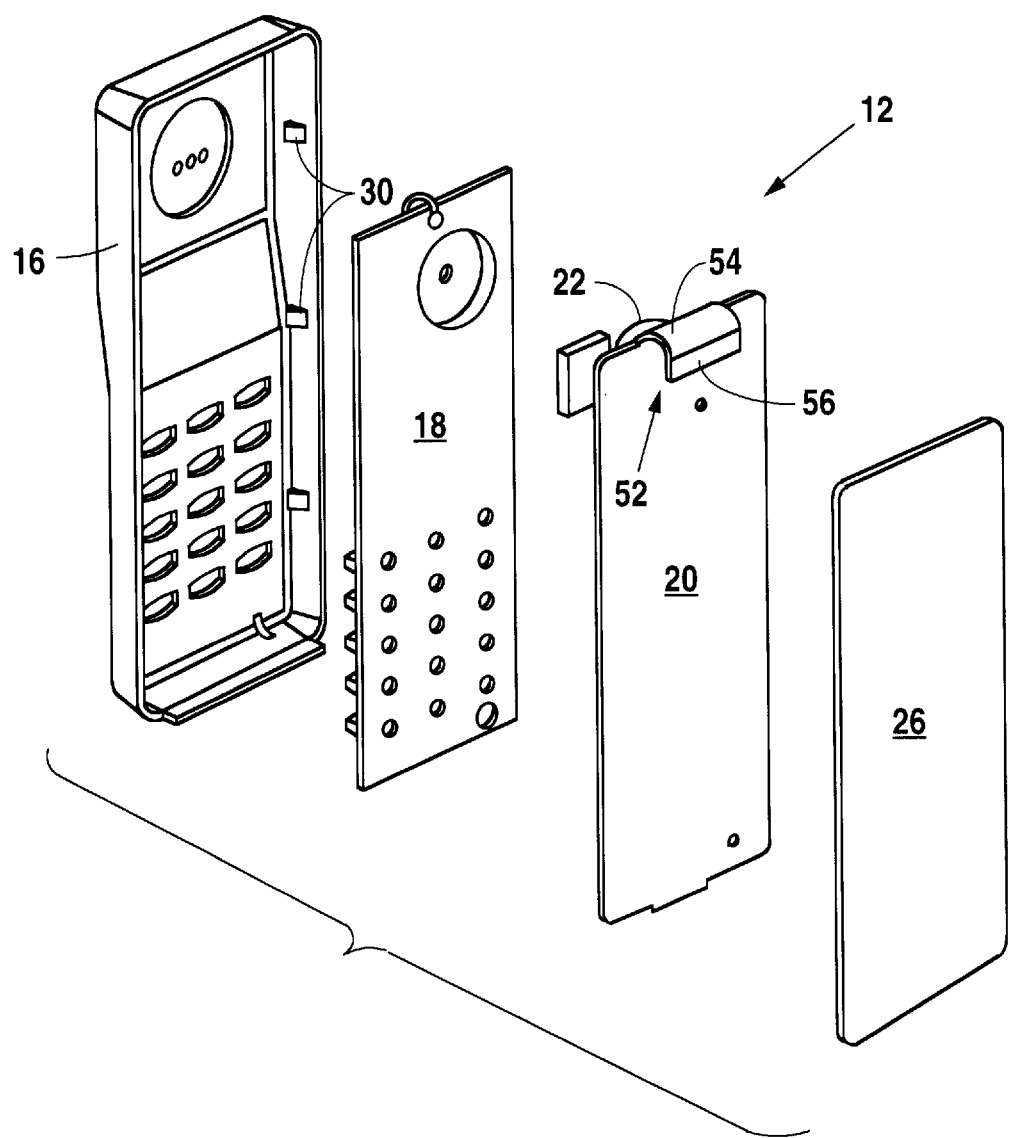
FIG. 2 is a exploded three-dimensional view of the electromechanical module of the cellular telephone embodying the present invention.
Figure 3:
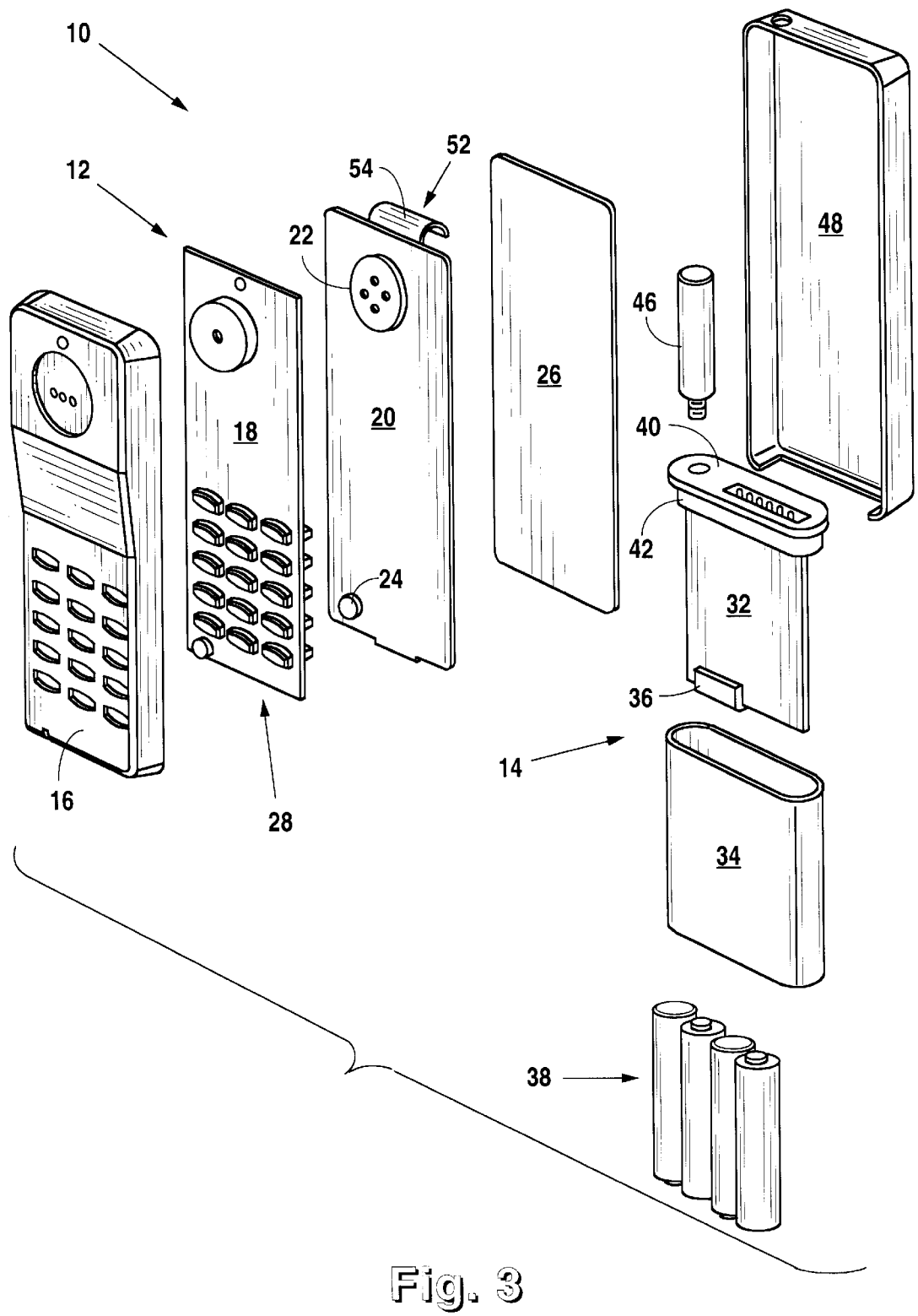
FIG. 3 is an exploded three-dimensional view of the cellular telephone embodying the present invention.

As best shown in the exploded views of FIG. 2 and FIG. 3, the electromechanical module 12 comprises a front housing 16, a keyboard panel 18, a flexfilm panel 20 having a speaker 22 and a microphone 24 mounted thereon and supporting circuitry formed therewith, and an electromechanical module cover 26.

The front housing 16 may, if desired, have an LCD panel mounted therein with appropriate electrical connections provided through the keyboard panel 18 to the flexfilm panel 20 for subsequent interconnection, as described below in greater detail, to the electronic module 14. Also, openings are provided for the individual keys of a keypad 28 mounted on the keyboard panel 18 and for audio transmission from the speaker 22 and into the microphone 24 mounted on the flexfilm panel 20. As best shown in FIG. 2, the components of the electromechanical module 12 are conveniently serially assembled in the front housing 16 and maintained in the assembled position by the cover 26 which is held in place by a plurality of tabs 30 integrally formed in the interior sidewalls of the front housing 16. In addition, although not shown, the electromechanical module 12 may also include a buzzer, indicator lights, and other features, depending upon a particular design or model.

As best shown in the exploded view of FIG. 3, the electronic module 14 includes a main printed circuit board (PCB) which includes all of the major radio-frequency and logic circuits required to provide at least basic cellular telephone service and support a variety of features that may be included in different electromechanical modules 12. Such circuits typically include a plurality of chips, integrated circuits, and other components interconnected within foil circuits formed either in, or on the surface of, the printed circuit board 32. Alternatively, the electronic module 14 may have other constructions such as encapsulated component and circuits or integrated circuits interconnected by flexible connectors. The electronic module 14 contains none of the mechanical components required for operation of the telephone.

Importantly, the printed circuit board 32 is mounted within a canister 34 that protectively supports the printed circuit board and provides RF shielding around the PCB 32 and associated electrical circuits mounted thereon. Battery connectors 36, in electrical communication with the radio-frequency and logic circuits, is provided at a lower portion of the PCB 32. An aperture, not shown, is provided in a wall at the bottom, or first end, of the canister 34 through which the battery connectors 36 extend and provide an electrical connection with a battery pack 38. If it is desired to seal the canister 34, an appropriate elastomeric seal or gasket may be provided between the battery connectors 36 and the aperture in the bottom of the canister 34.

Desirably, the canister 34 is sealed at an otherwise open upper, or second, end by a platform seal 40 preferably formed of an elastomeric material such polyurethane. The platform seal 40 desirably has a downwardly extending flange 42 containing a groove to receive and support an end of the printed circuit board 32. Also, the lower surface of the platform seal 40 may have an inwardly extending groove adapted to engage the upper ends of the walls of the canister 34. Thus, when installed, the platform seal not only provides a holder for the printed circuit board 32, but also provides a peripheral seal around the upper, otherwise open, end of the canister 34. Desirably, the platform seal 40 also has an opening adapted to provide a seal around a multiple pin connector 44 attached to the upper end of the printed circuit board 32 in electrical communication with the radio-frequency and logic circuits on the PCB 32.

Importantly, the cellular telephone 10 embodying the present invention includes a means 52 for providing a detachable electrical connection between the electromechanical module 12 and the electronic module 14. In the preferred exemplary embodiment, the means 52 for providing a detachable electrical connection between the electromechanical module 12 and the electronic module 14 includes a flexible electrical cable 54 that is connected to predefined electrical circuits on the flexfilm member 20 of the electromechanical module 12. The electrical cable 54 has an electrical connector 56 disposed at an end of the cable 54, as best shown in FIG. 2, that is adapted to mate with the connector 44 on the electronic module 14. The flexible cable 54 provides a convenient method of electrically connecting the electromechanical module 12 to the electronic module 14. Thus, different electromechanical modules 12 may be electrically connected to the electronic module 14, regardless of its shape, size, arrangement, configuration, or features. Alternatively, the means 52 for providing a detachable electrical connection between the electromechanical module 12 and the electronic module 14 may comprise a direct pin connection, extending through the cover 26, that provides a rigid electrical interconnection between the modules 12, 14.

The cellular telephone 10 embodying the present invention also includes an antenna 46 that extends through an aperture provided in the platform seal 40 and is electrically connected to the printed circuit board 32. If desired, a structural mounting support for the antenna 46 may be provided either in the platform seal 40 or within the canister 34.

The cellular telephone 10 may also include a rear housing 44 that is connectable to the front housing 16 by snap-engagement, interference fit with the front housing 16, whereupon the electronic module 14 and battery pack 38 are retained between the rear housing 48 and the cover 26 of the electromechanical module 12. Also, the rear housing 48 may have a removable panel 50 providing access to the battery pack 38 for replacement or recharging purposes.

The modular construction of the cellular telephone 10 embodying the present invention makes it particularly adaptable for use as a disposable cellular telephone as disclosed in concurrently filed and commonly assigned U.S. patent application Ser. No. 08/743,403, filed Nov. 1, 1996, entitled Recyclable Cellular Telephone and Method and Apparatus for Supporting the Use of a Recyclable Cellular Telephone within a Cellular Telephone Network, comprising Attorney Docket Number 27951-00082. The term "disposable," as used herein and in the above-referenced application, means that the thus-identified component is designed to be used once for a limited period of use, and then thrown away. Thus, the disposable component has negligible economic value after a certain limited period of use. In the present invention, a disposable cover 58 may be used to provide a limited use instrument, as described in the above-referenced concurrently filed application, either with or without the rear housing 48. The disposable outer cover 58 may be conveniently formed of plastic, cardboard, paperboard, heavy cardstock having a weight of at least 50 #, or similar readily-disposable, flexible but still sturdy, material. If desired, the selected material may be electrically coated or made conductive to provide additional RF shielding.

Figure 5:
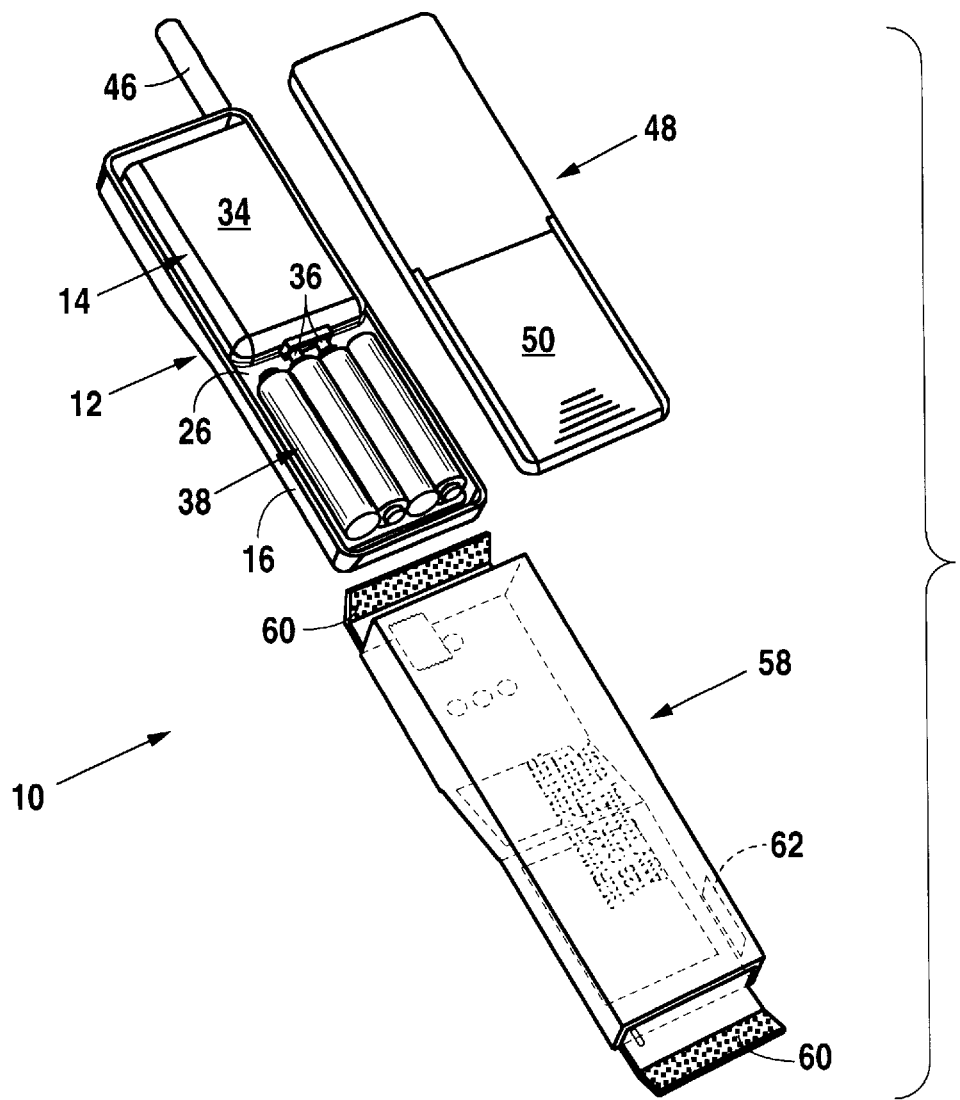
FIG. 5 is an exploded three-dimensional view of the cellular telephone embodying the present invention, showing a disposable cover enclosing the instrument.

As shown in FIG. 5, the disposable outer cover 58 may be formed as an open-ended sleeve having adhesive-coated closable tabs 60 disposed at each end of the sleeve. Desirably, the end closure tabs 60 may be closed and sealed after insertion of the electromechanical module 12, the electronic module 14, the battery pack 38 and, if used, the rear housing 48, into the sleeve portion of the disposable cover 58. As described in greater detail in the referenced concurrently filed application, the disposable cover 58 is desirably provided with an appropriately positioned aperture 62 to provide visual observation of identifying indicia that may be provided on the front housing 16 of the electromechanical module 12, and other apertures as may be required for access to, or observation of, the keypad, LCD panel, microphone, and speaker elements of the electromechanical module 12

The modular construction of the cellular telephone 10 embodying the present invention is particularly useful as a recyclable telephone adapted for use for a limited period of time or number of events. After the predetermined period of use, the cellular telephone may desirably be returned to a service center via mail, as provided by a pre-addressed label or direct imprint on an outer surface of the disposable cover 58, whereupon the disposable cover 58 is removed and discarded, and the telephone 10 refurbished for reuse. In the refurbishment process, any faulty components of the electromechanical module 12, such as the keyboard panel 18, the front housing 16, the flexfilm panel 20, the speaker 22, the microphone 24, or other element, can be readily replaced without damaging other components of the instrument. Also, the electronic module 14 can be easily tested by detaching the electrical cable connector 54 from the electronic module connector 44, and inserting a test circuit connector in its place. If faulty, the electronic module 14 can also be readily replaced. Furthermore, if internal circuitry is used to control the period of use of the instrument, those circuits may be reset through the connector 44.

Thus, it can be seen that the cellular telephone 10 embodying the present invention not only provides an efficient and economical way to change the user interface features of a telephone to provide different models having a common electronic module 14, but also is particularly suited for recyclable use applications were it may be desirable to replaced broken or faulty electromechanical components. Also, it can be seen that the modular construction, using a common electronic module 14 in all applications, gives freedom of design which is not limited in size, shape, or fixed positioning of user interface components, since those elements and components are not mounted on a printed circuit board containing the RF and logic circuits of the instrument.

Although the present invention is described in terms of a preferred exemplary embodiment, with specific illustrated key constructions in component arrangements, those skilled in the art will recognize that changes in those arrangements and constructions may be made without departing from the spirit of the invention. Such changes are intended to fall within the scope of the following claims. Other aspects, features, and advantages of the present invention may be obtained from a study of this disclosure and the drawings, along with the appended claims.

What is claimed is:

1. A portable telecommunication instrument having a housing and comprising:
   an electromechanical module comprising a keypad, a speaker, and a microphone, said keypad, speaker and microphone being mounted in a front portion of said housing;
   an electronic module disposed in said housing and comprising a canister having first and second ends and electrical components forming radio-frequency and logic circuits, said electrical components being protectively enclosed by said canister; and
   a means for providing an electrical connection between said electromechanical module and said electronic module.

2. A portable telecommunication instrument, as set forth in claim 1, wherein said canister is formed of a radio-frequency shielding material.

3. A portable telecommunication instrument, as set forth in claim 1, wherein said electrical components of the electronic module are mounted on a printed circuit board providing electrical communication between said components.

4. A portable telecommunication instrument, as set forth in claim 3, wherein said printed circuit board includes a battery connector in electrical communication with said radio-frequency and said logic circuits.

5. A portable telecommunication instrument, as set forth in claim 1, wherein said canister includes an electrical connector disposed therein in electrical communication with said radio-frequency and said logic circuits.

6. A portable telecommunication instrument, as set forth in claim 5, wherein said means for providing a detachable electrical connection between said electromechanical module and said electronic module includes an electrical cable connected with predefined electrical circuits of said electromechanical module, said cable having an electrical connector disposed on an end of said cable, and said electrical connector of said electronic module is adapted to mate with the connector disposed on the end of said cable.

7. A portable telecommunication instrument, as set forth in claim 1, wherein said instrument includes a disposable cover substantially enclosing said instrument.

8. A portable telecommunication instrument, as set forth in claim 7, wherein said instrument includes a battery pack in electrical communication with said electronic module, and said disposable cover forms a portion of an enclosure around said canister and said battery pack.

9. A portable telecommunication instrument, comprising:
   an electromechanical module comprising a front housing, a keypad, a speaker, and a microphone, said keypad, speaker and microphone being mounted in said front housing;
   an electronic module comprising electrical components forming radio-frequency and logic circuits mounted on a printed circuit board providing electrical communication between said components and having a battery connector in electrical communication with said radio-frequency and said logic circuits, and a canister having first and second ends and an aperture extending through a wall disposed at said first end of said canister and providing an opening for the projection therethrough of said battery connector of the printed circuit board, said electrical components and said printed circuit board being protectively enclosed within said canister; and
   a means for providing an electrical connection between said electromechanical module and said electronic module.

10. A portable telecommunication instrument, comprising:
   an electromechanical module comprising a front housing, a keypad, a speaker, and a microphone, said keypad, speaker and microphone being mounted in said front housing;
   an electronic module comprising a canister having first and second ends and electrical components forming radio-frequency and logic circuits protectively enclosed by said canister, said canister including an electrical connector disposed therein in electrical communication with said radio-frequency and said logic circuits and a platform seal disposed at said second end of said canister, said platform seal providing a seal around said electrical connector disposed in said canister; and
   a means for providing and electrical connection between said electromechanical module and said seal module.

11. A portable telecommunication instrument, as set forth in claim 10, wherein said instrument includes an antenna in electrical communication with said radio-frequency circuits of said electronic module, and said platform seal disposed at said second end of the canister has an opening for said antenna.

12. A portable telecommunication instrument, comprising:
   an electromechanical module comprising a front housing a keypad, a speaker, and a microphone, said keypad, speaker and microphone being mounted in said front housing;
   an electronic module comprising a canister having first and second ends and electrical components forming radio-frequency and logic circuits protectively enclosed by said canister;
   a means for providing an electrical connection between said electromechanical module and said electronic module; and
   a rear housing adapted for attachment to said front housing, said rear housing cooperating with said front housing to provide an enclosure about said electromechanical module and said electronic module.

* * * * *